(12) United States Patent
Ozeki et al.

(10) Patent No.: US 7,046,366 B2
(45) Date of Patent: May 16, 2006

(54) APPARATUS, METHOD, AND PROGRAM FOR MEASURING OPTICAL CHARACTERISTIC USING QUANTUM INTERFERENCE, AND RECORDING MEDIUM FOR RECORDING THE PROGRAM

(75) Inventors: Takeshi Ozeki, Saitama (JP); Takashi Kido, Miyagi (JP)

(73) Assignee: Advantest Corporation, Tokyo (JP)

( * ) Notice: Subject to any disclaimer, the term of this patent is extended or adjusted under 35 U.S.C. 154(b) by 426 days.

(21) Appl. No.: 10/643,907

(22) Filed: Aug. 20, 2003

(65) Prior Publication Data

US 2005/0078315 A1    Apr. 14, 2005

(30) Foreign Application Priority Data

Aug. 23, 2002    (JP) .............................. 2002-244176

(51) Int. Cl.
    *G01B 9/02*    (2006.01)
(52) U.S. Cl. ...................................... 356/477
(58) Field of Classification Search ............... 356/73.1, 356/450, 477
    See application file for complete search history.

(56) References Cited

U.S. PATENT DOCUMENTS 6,646,727 B1 * 11/2003 Saleh et al. ................. 356/73.1
6,678,054 B1 * 1/2004 Kisner et al. ................ 356/450
6,909,497 B1 * 6/2005 Holbrook .................... 356/73.1

* cited by examiner

*Primary Examiner*—Gregory J. Toatley, Jr.
*Assistant Examiner*—Michael A. Lyons
(74) *Attorney, Agent, or Firm*—Lowe Hauptman & Berner, LLP

(57) ABSTRACT

To enable measuring optical characteristics of a device under test by overcoming a limit of detection sensitivity caused by detecting light as "wave". Of an entangled photon pair generated by entangled photon pair generating means 20, signal light transmits through a device under test (DUT) 10, and idler light transmits through a variable delay line 30. The signal light after transmitting through the device under test (DUT) 10, and the idler light after transmitting through the variable delay line 30 are supplied for a semi-transparent mirror 40 to generate quantum interference. Then, if the timing when photon of the first multiplexed light is detected by a first photon detector 50a, and the timing when photon of the second multiplexed light is detected by a second photon detector 50b match, a multiplier 62 supplies a pulse, and a counter 64 counts the pulse. Based on the count, characteristic measuring means 70 obtains match detection probability, thereby measuring optical parameters of the device under test. Since the measurement uses the quantum interference, it is possible to measure the optical characteristics of the device under test at a high accuracy, and in a wide dynamic range.

16 Claims, 9 Drawing Sheets

PDC : Parametric down-converter

APPARATUS, METHOD, AND PROGRAM FOR MEASURING OPTICAL CHARACTERISTIC USING QUANTUM INTERFERENCE, AND RECORDING MEDIUM FOR RECORDING THE PROGRAM

BACKGROUND OF THE INVENTION

1. Field of the Invention

The present invention relates to measuring wavelength dependency of optical parameters such as the attenuation constant, the delay, the dispersion, and the like of a device under test.

2. Description of the Background Art

Conventionally, wavelength dependency of optical parameters such as the attenuation constant, the delay, the dispersion, and the like of a device under test (DUT) such as an optical fiber has been measured.

As the measuring method, methods using a Michelson interferometer and an optical network analyzer have been conventionally applied. Note that the method using the optical network analyzer is disclosed in (1) S. Ryu, Y. Horiuchi, K. Mochizuki, "Novel chromatic dispersion measurement method over continuous Gigahertz tuning range" J. Lightwave Technol., vol. 7, no. 8, pp. 1177–1180, 1989, and (2) M. Fujise, M. Kuwazuru, H. Nunokawa, and Y Iwamoto. "Chromatic dispersion measurement over a 100-km dispersion-shifted single-mode fibre by a new phase-shift technique" Electron. Lett., vol. 22, no. 11, pp. 570–572, 1986.

A constitution using the Michelson interferometer for measuring a device under test (DUT) is shown in FIG. 8. Light emitted from a light source 100 is separated into a reflected component and a transmitted component by a semi-transparent mirror 102. The reflected component transmits through a DUT 104, is reflected by a mirror 106, transmits through the DUT 104 again, and returns to the semi-transparent mirror 102. The transmitted component transmits through a variable delay line 108, is reflected by a mirror 110, transmits through the variable delay line 108 again, and returns to the semi-transparent mirror 102. The variable delay line 108 can change the optical path length of the transmitted component. The reflected component and the transmitted component having returned to the semi-transparent mirror 102 are multiplexed. At this moment, interference occurs. The light multiplexed by the semi-transparent mirror 102 is detected by a photodetector 114 through a mirror 112, and is converted into an electric signal. A processing unit 116 measures the wavelength dependency of the optical parameters of the DUT 104 based on the electric signal. Namely, the wavelength dependency of the optical parameters of the DUT 104 is measured using the interference between the light transmitting through the DUT 104, and the light transmitting through the variable delay line 108.

A constitution of a measuring system using the optical network analyzer for measuring a device under test (DUT) is shown in FIG. 9. Light emitted from a wavelength variable light source 200 is intensity-modulated by a light intensity modulator 204 based on a signal $f_{IF}$ of a reference high frequency signal source 202, and enters into a device under test 206. The light entered into the device under test 206 transmits through the device under test 206, is detected by a photodetector 208, and is converted into an electric signal. The electric signal is amplified by an amplifier 210, and the phase and the amplitude is compared with the signal $f_{IF}$ by a phase/amplitude comparator 222. As a result of the comparison, the phase and the amplitude are obtained, are converted into digital signals by an A/D converter 224, and are processed by a data processing block 226, and the wavelength dependency of the optical parameters of the device under test 206 is measured. Note that the phase/amplitude comparator 222, the A/D converter 224, and the data processing block 226 are parts of an network analyzer 220.

SUMMARY OF THE INVENTION

However, with the methods described above, the optical parameters are measured by detecting the light as "wave" (the photodetector 114 and the photodetector 208), and converting into the electric signals. Thus, the detection sensitivity is limited, and it is impossible to measure with a high accuracy or in a wide dynamic range. For example, when the loss of the power of the light is large when the light transmits through the device under test, the measurement accuracy degrades, or the measurement cannot be conducted.

In view of the foregoing, the object of the present invention is to overcome the limit of the detection sensitivity brought about by detecting light as "wave", and to measure optical parameters of a device under test at a high accuracy or in a wide dynamic range.

According to an aspect of the present invention, an optical characteristic measuring apparatus for measuring optical characteristic of a device under test includes: an entangled photon pair generating unit for generating an entangled photon pair, and supplying the device under test with first light which is one of the entangled photon pair; an optical path length changing unit for changing at least one of an optical path of second light which is the other one of the entangled photon pair, and an optical path of the first light; a quantum interfering unit for transmitting and reflecting the first light transmitting through the device under test, transmitting and reflecting the second light, supplying first multiplexed light which is formed by multiplexing the reflected component of the first light and the transmitted component of the second light, and supplying second multiplexed light which is formed by multiplexing the transmitted component of the first light and the reflected component of the second light; a photon detecting unit for detecting a photon in the first multiplexed light and the second multiplexed light; a photon simultaneous detection measuring unit for measuring a quantity which changes when the photons are simultaneously detected by the photon detecting unit; and a characteristic measuring unit for measuring the optical characteristic of the device under test based on the quantity measured by the photon simultaneous detection measuring unit.

An optical characteristic measuring apparatus constituted as described above measures the optical characteristics of the device under test by utilizing quantum interference of entangled photon pair to detect photons. Thus, it is possible to overcome the limit of the detection sensitivity brought about by detecting light as "wave", and to measure the optical parameters of the device under test at a high accuracy or in a wide dynamic range.

According to the present invention, the entangled photon pair generating unit includes: a light source for signal for generating input signal light; a light source for excitation for generating input excited light with a frequency higher than that of the input signal light; and an optical parametric amplifier for receiving the input signal light and the input excited signal light, and generating signal light with a frequency equal to the frequency of the input signal light, and idler light with a frequency equal to the difference between the frequency of the input excited light and the frequency of the input signal light.

According to the present invention, the entangled photon pair generating unit includes: a light source for excitation for generating input excited light; and a spontaneous parametric down-converting unit for receiving the input excited light, and generating signal light and idler light.

According to the present invention, the quantum interfering unit is a semi-transparent mirror.

According to the present invention, the quantum interfering unit is a beam splitter.

According to the present invention, the transmission optical paths from the entangled photon pair generating unit, transmitting thorough the quantum interfering unit, to the photon detecting unit of the first light and the second light can be set equal, and the reflection optical paths from the entangled photon pair generating unit, reflected by the quantum interfering unit, to the photon detecting unit of the first light and the second light can differ from each other by a length sufficiently longer than the coherence length of the first light and the second light.

According to the present invention, the photon detecting unit includes: a first photon detecting unit for detecting a photon of the first multiplexed light; and a second photon detecting unit for detecting a photon of the second multiplexed light.

According to the present invention, the photon simultaneous detection measuring unit includes: a simultaneous detection signal supplying unit for supplying a simultaneous detection signal when the first photon detecting unit and the second photon detecting unit simultaneously detect photons; and a counting unit for counting the frequency of the simultaneous detection signal supplied from the simultaneous detection signal supplying unit.

According to the present invention, the photon detecting unit includes: a third multiplexed light generating unit for generating third multiplexed light by multiplexing the first multiplexed light and the second multiplexed light after changing the direction of polarization of the first multiplexed light or the second multiplexed light by 90 degrees; and a simultaneous detection light supplying unit for receiving the third multiplexed light, and supplying simultaneous detection light whose frequency is the sum of the frequency of the first multiplexed light and the frequency of the second multiplexed light when the first multiplexed light and the second multiplexed light simultaneously have high light intensity.

According to the present invention, the photon simultaneous detection measuring unit includes: an optical filter for receiving the output from the simultaneous detection light supplying unit, and transmitting the light having the frequency which is the sum of the frequency of the first multiplexed light and the frequency of the second multiplexed light; a light detecting unit for converting the light having transmitted through the optical filter into an electric signal; and a voltage measuring unit for measuring the voltage of the electric signal.

According to the present invention, the characteristic measuring unit measures the delay or the dispersion of the device under test.

According to the present invention, the characteristic measuring unit measures the attenuation constant of the device under test based on the quantity measured by the photon simultaneous detection measuring unit when the first light is supplied for the device under test, and the quantity measured by the photon simultaneous detection measuring unit when the first light is directly entered into the quantum interfering unit.

According to the present invention, the characteristic measuring unit measures a frequency characteristic of the dispersion in a region of a frequency dispersion with the phase matching frequency of the optical parametric amplifier as the center based on Fourier transform of the quantity measured by the photon simultaneous detection measuring unit.

According to another aspect of the present invention, an optical characteristic measuring method for measuring optical characteristic of a device under test includes: an entangled photon pair generating step for generating an entangled photon pair, and supplying the device under test with first light which is one of the entangled photon pair; an optical path length changing step for changing at least one of an optical path of second light which is the other one of the entangled photon pair, and an optical path of the first light; a quantum interfering step for transmitting and reflecting the first light transmitting through the device under test, transmitting and reflecting the second light, supplying first multiplexed light which is formed by multiplexing the reflected component of the first light and the transmitted component of the second light, and supplying second multiplexed light which is formed by multiplexing the transmitted component of the first light and the reflected component of the second light; a photon detecting step for detecting a photon in the first multiplexed light and the second multiplexed light; a photon simultaneous detection measuring step for measuring a quantity which changes when the photons are simultaneously detected by the photon detecting step; and a characteristic measuring step for measuring the optical characteristic of the device under test based on the quantity measured by the photon simultaneous detection measuring step.

Another aspect of the present invention is a program of instructions for execution by the computer to perform an optical characteristic measuring process performed by an apparatus for measuring optical characteristic of a device under test including: an entangled photon pair generating unit for generating an entangled photon pair, and supplying the device under test with first light which is one of the entangled photon pair; an optical path length changing unit for changing at least one of an optical path of second light which is the other one of the entangled photon pair, and an optical path of the first light; a quantum interfering unit for transmitting and reflecting the first light transmitting through the device under test, transmitting and reflecting the second light, supplying first multiplexed light which is formed by multiplexing the reflected component of the first light and the transmitted component of the second light, and supplying second multiplexed light which is formed by multiplexing the transmitted component of the first light and the reflected component of the second light; a photon detecting unit for detecting a photon in the first multiplexed light and the second multiplexed light; and a photon simultaneous detection measuring unit for measuring a quantity which changes when the photons are simultaneously detected by the photon detecting unit, the process including a characteristic measuring processing for measuring the optical characteristic of the device under test based on the quantity measured by the photon simultaneous detection measuring unit.

Another aspect of the present invention is a computer-readable medium having a program of instructions for execution by the computer to perform an optical characteristic measuring process performed by an apparatus for measuring optical characteristic of a device under test including: an entangled photon pair generating unit for generating an entangled photon pair, and supplying the device under test with first light which is one of the entangled photon pair; an optical path length changing unit for changing at least one of an optical path of second light which is the other one of the entangled photon pair, and an optical path of the first light; a quantum interfering unit for transmitting and reflecting the first light transmitting through the device under test, transmitting and reflecting the second light, supplying first multiplexed light which is formed by multiplexing the reflected component of the first light and the transmitted component of the second light, and supplying second multiplexed light which is formed by multiplexing the transmitted component of the first light and the reflected component of the second light; a photon detecting unit for detecting a photon in the first multiplexed light and the second multiplexed light; and a photon simultaneous detection measuring unit for measuring a quantity which changes when the photons are simultaneously detected by the photon detecting unit, the process including a characteristic measuring processing for measuring the optical characteristic of the device under test based on the quantity measured by the photon simultaneous detection measuring unit.

DETAILED DESCRIPTION OF THE INVENTION

The following section describes embodiments of the present invention while referring to drawings.

First Embodiment

Figure 1:
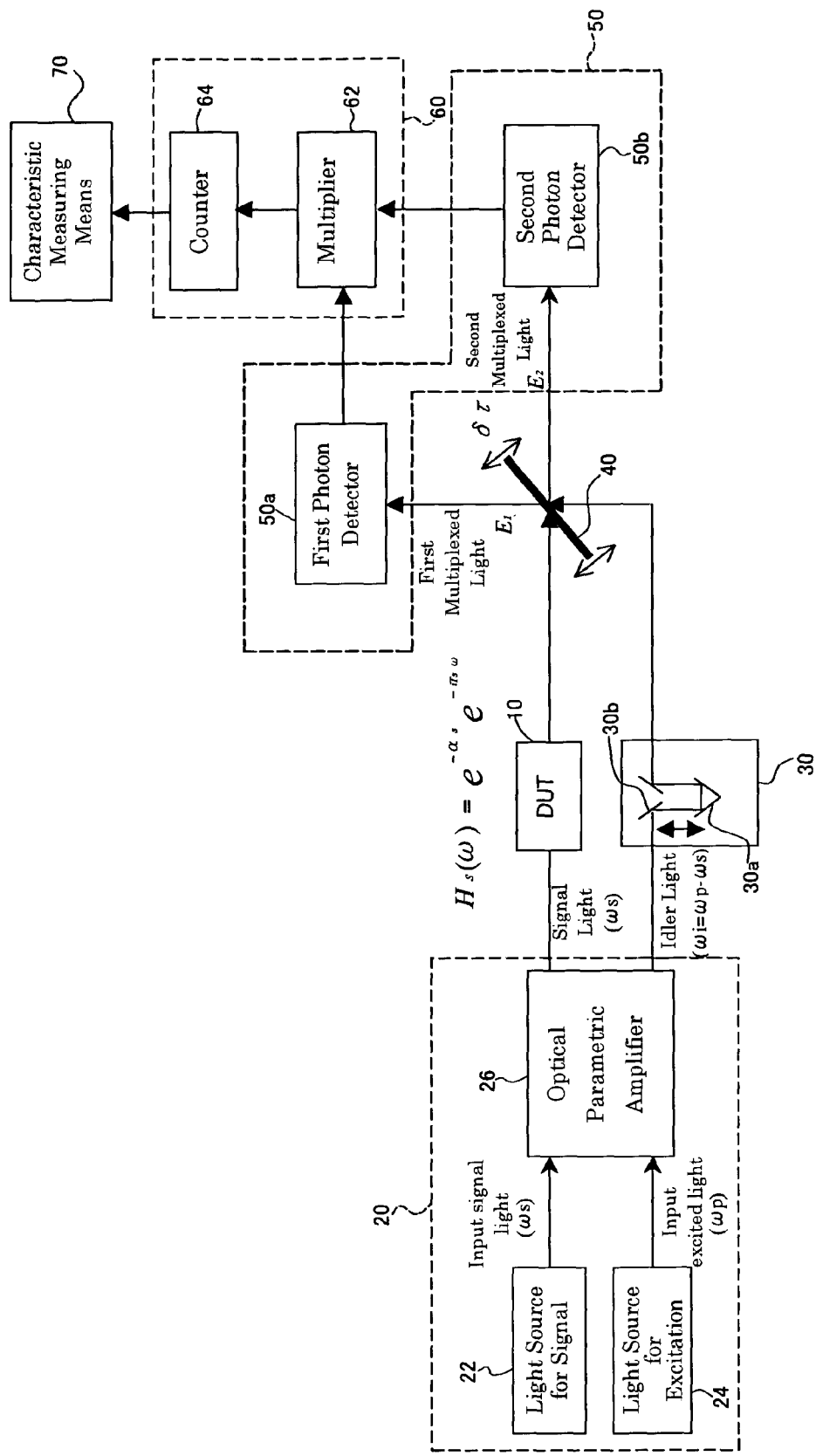
FIG. 1 is a block diagram showing the constitution of an optical characteristic measuring apparatus according to a first embodiment of the present invention.

FIG. 1 is a block diagram showing the constitution of an optical characteristic measuring apparatus according to a first embodiment of the present invention. The optical characteristic measuring apparatus according to the first embodiment measures the wavelength dependency of optical parameters such as the delay, the attenuation constant, and the dispersion of a device under test 10 (DUT).

The optical characteristic measuring apparatus includes entangled photon pair generating means 20, a variable delay line (optical path length changing means) 30, a semi-transparent mirror (quantum interfering means) 40, photon detecting means 50, photon simultaneous detection measuring means 60, and characteristic measuring means 70.

The entangled photon pair generating means 20 generates entangled photon pairs. The entangled photon pair generating means 20 includes a light source for signal 22, a light source for excitation 24, and an optical parametric amplifier 26.

The light source for signal 22 generates input signal light. The input signal light includes at least a component with a frequency of $\omega s$. The input signal light is a Gaussian type weak pulse having a frequency dispersion of $\sigma s$ for a limited pulse width at the phase match frequency $\omega c$ of the optical parametric amplifier 26. Or the input signal light may be a weak pulse with a pulse width sufficiently narrow so as to be neglected ($\sigma s >> \sigma c$, note that $\sigma c$ is the dispersion of the phase matching of the optical parametric amplifier 26) or white broadband weak light such as ASE. The input signal light may be weak cw light.

The light source for excitation 24 generates input excited light. The input excited light includes at least a component with a frequency of $\omega p$. Note that $\omega p > \omega s$.

The optical parametric amplifier (OPA) 26 receives the input signal light (frequency $\omega s$) and the input excited light (frequency $\omega p$). The optical parametric amplifier 26 generates signal light (frequency $\omega s$) and idler light (frequency $\omega i = \omega p - \omega s$). The signal light and the idler light form an entangled photon pair.

The performance of the optical parametric amplifier 26 is determined by the phase match frequency $\omega c$ and the dispersion of the phase match $\sigma c$ (the dispersion of the frequency at which the electric field strength of the output light is 1/e when the output light is shifted from the phase match frequency). At this moment, the entangled photon pairs are generated efficiently when $\omega c = \omega p/2$. Thus, the first embodiment satisfies $\omega c = \omega p/2$. The state vector of the entangled photon pair supplied from the optical parametric amplifier 26 is described by expression (1) below.

$$|\Psi\rangle = \int_{-\infty}^{\infty} \emptyset(\omega)d\omega |1_\omega\rangle_s |1_{\omega_p-\omega}\rangle_i \quad (1)$$

A positive frequency component of the electric field operator of the signal light supplied from the optical parametric amplifier 26 is expressed by Fourier integral as in expression (2), and a positive frequency component of the electric filed operator of the idler light is expressed by Fourier integral as in expression (3).

$$E_s^+(t) = \frac{1}{2\pi} \int d\omega A_s(\omega) e^{-i\omega t} a_s(\omega) \quad (2)$$

$$E_i^+(t) = \frac{1}{2\pi} \int d\omega A_i(\omega) e^{-i\omega t} a_i(\omega) \quad (3)$$

In this expression, As(ω) is the electric field amplitude component at the frequency of ω of the signal light, and Ai(ω) is the electric filed amplitude component at the frequency of ω of the idler light. In this embodiment, a type I nonlinear optical crystal which makes the polarization directions of the signal light and the idler light equal is used as the optical parametric amplifier 26.

The frequency ω of the signal light and the frequency ω' of the idler light supplied from the optical parametric amplifier 26 are expressed as follows while an infinitesimal parameter ε is introduced.

ω=ωc+ε

ω'=ωc−ε

When the performance of the optical parametric amplifier 26 is determined by the phase match frequency ωc, and the dispersion of the phase match σc, the input signal light is the Gaussian weak pulse having the frequency dispersion of σs for a limited pulse width at the phase match frequency ωc of the optical parametric amplifier 26, and the input excited (pump) light is light with a single frequency of ωp, As(ω) and As(ω') are expressed by expressions (4) and (5). Note that ωp=2ωc.

$$A_s(\omega) = A_s(\omega_c + \varepsilon) \quad (4)$$
$$= A_s(\omega_c)e^{-(\omega-\omega c)^2/2\sigma^2}$$
$$= A_s(\omega_c)e^{-\frac{\varepsilon^2}{2\sigma^2}}$$

$$A_i(\omega') = A_i(\omega_c - \varepsilon) \quad (5)$$
$$= A_i(\omega_c)e^{-(\omega'-\omega c)^2/2\sigma^2}$$
$$= A_i(\omega_c)e^{-\frac{(-\varepsilon)^2}{2\sigma^2}}$$
$$= A_i(\omega_c)e^{-\frac{\varepsilon^2}{2\sigma^2}}$$

In this equation, $\sigma^2 = \sigma c^2 \sigma s^2/(\sigma c^2 + \sigma s^2)$. There is a relationship of $Lcoh = \sqrt{2}c/\sigma$ between the σ and the coherence length Lcoh of the signal light and the idler light. Note that (c) denotes the velocity of light.

When the performance of the optical parametric amplifier 26 is determined by the phase match frequency ωc, the dispersion of the phase match σc, the input signal light is a weak pulse with a pulse width sufficiently narrow so as to be neglected (the frequency band is sufficiently broader than the frequency band of the phase match, σs>>σc) or white broadband weak light such as ASE, and the input excited (pump) light is light with a single frequency of ωp, As(ω) and Ai(ω') are represented as expressions (6) and (7).

$$A_s(\omega) = A_s(\omega_c + \varepsilon) \quad (6)$$
$$= A_s(\omega_c)e^{-\frac{\varepsilon^2}{2\sigma_c^2}}$$

$$A_i(\omega') = A_i(\omega_c - \varepsilon) \quad (7)$$
$$= A_i(\omega_c)e^{-\frac{(-\varepsilon)^2}{2\sigma_c^2}}$$
$$= A_i(\omega_c)e^{-\frac{\varepsilon^2}{2\sigma_c^2}}$$

There is a relationship of $Lcoh = \sqrt{2}c/\sigma c$ between the σc and the coherence length Lcoh of the signal light and the idler light.

The signal light (first light) supplied from the optical parametric amplifier 26 is supplied for the device under test 10, and the idler light (second light) is supplied for the variable delay line 30.

The impulse response function of the device under test 10 is represented as the following expression (8). Note that the dispersion is not considered.

$$H_s(\omega)=H_s(\omega_c+\varepsilon)=\exp(-\alpha_s)\exp(-iT_s\omega)=\exp(-\alpha_s)\exp(-iT_s\omega_c)\exp(-iT_s\varepsilon) \quad (8)$$

Note that αs: attenuation constant of the device under test 10 due to dispersion and absorption, and Ts: delay of the device under test 10.

The variable delay line (optical path length changing means) 30 can change the optical path length of the idler light (second light). The variable delay line 30 includes a movable mirror 30a and a fixed mirror 30b. The movable mirror 30a and the fixed mirror 30b form an optical path for the idler light, and the optical path length for the idler light is changed by approaching/departing the movable mirror 30a toward/from the fixed mirror 30b. The period for which the idler light transmits through the variable delay line 30 is referred to as a delay τ. The variable delay line 30 changes the optical path length for the idler light to change the delay τ.

As described later, by changing the delay τ, the delay τ which maximizes the probability that the photon of the signal light (first light) and the photon of the idler light (second light) are detected simultaneously is obtained. This delay τ is the delay Ts of the device under test 10.

Note that the variable delay line (optical path length changing means) 30 may change the optical path length of the signal light instead of the optical path length of the idler light. Or it may change the optical path lengths of the idler light and the signal light. The optical path length referred to here is the length of an optical path along which the idler light or the signal light reaches the photon detecting means 50 after transmitting through or reflected on the semi-transparent mirror 40.

The semi-transparent mirror (quantum interfering means) 40 receives the signal light (first light) after transmitting through the device under test 10 or the idler light (second light) after transmitting through the variable delay line 30. A positive frequency component of the electric field operator of the signal light (first light) after transmitting through the device under test 10 is expressed by expression (9), and a positive frequency component of the electric filed operator of the idler light (second light) after transmitting through the variable delay line 30 is expressed by expression (10). Note that it is assumed that the loss of the light due to the variable delay line 30 is negligible.

$$E_s^+(t) = \frac{1}{2\pi}\int d\omega H_s(\omega)A_s(\omega)e^{-i\omega t}a_s(\omega) \quad (9)$$

$$E_i^+(t) = \frac{1}{2\pi}\int d\omega A_i(\omega)e^{-i\omega(t+\tau)}a_i(\omega) \quad (10)$$

The semi-transparent mirror 40 is tilted by 45 degrees with respect to the signal light after transmitting through the device under test 10, and the idler light after transmitting through the variable delay line 30. Note that the angle between the signal light after transmitting through the device under test 10, and the idler light after transmitting through the variable delay line 30 enter the semi-transparent mirror 40 such that the angle between them is 90 degrees. The signal light after transmitting through the device under test 10 enters the front surface of the semi-transparent mirror 40, and the idler light after transmitting through the variable delay line 30 enters the rear surface of the semi-transparent mirror 40. It is assumed that the transmittance and the reflectance of the semi-transparent mirror 40 is 50%:50%.

The semi-transparent mirror 40 reflects the signal light transmitting through the device under test 10. The phase of the reflected light changes by π/2. The semi-transparent mirror 40 transmits the idler light which has transmitted through the variable delay line 30. The signal light reflected by the semi-transparent mirror 40, and the idler light transmitting through the semi-transparent mirror 40 are multiplexed, and supplied as first multiplexed light. The traveling direction of the first multiplexed light is equal to the incident direction to the semi-transparent mirror 40 of the idler light after transmitting through the variable delay line 30.

The semi-transparent mirror 40 transmits the signal light after transmitting through the device under test 10. The semi-transparent mirror 40 reflects the idler light after transmitting through the variable delay line 30. The phase of the reflected light changes by π/2. The signal light transmitting through the semi-transparent mirror 40, and the idler light reflected by the semi-transparent mirror 40 are multiplexed, and supplied as second multiplexed light. The traveling direction of the second multiplexed light is equal to the incident direction to the semi-transparent mirror 40 of the signal light after transmitting through the device under test 10.

The semi-transparent mirror 40 is provided with a moving mechanism (not shown) which can change the optical path length of the light reflected by the semi-transparent mirror 40 by a quantity corresponding to a period δτ. A positive frequency component of the electric field operator of the first multiplexed light is expressed by expression (11), and a positive frequency component of the electric filed operator of the second multiplexed light is expressed by expression (12).

$$E_1^+(t) = \frac{i}{\sqrt{2}} E_s^+(t) + \frac{1}{\sqrt{2}} E_i^+(t) \quad (11)$$

$$= \frac{1}{\sqrt{2}} \left( \frac{1}{2\pi} \int_{-\infty}^{\infty} d\omega H_s(\omega) A_s(\omega) \hat{a}_s(\omega) e^{+i\frac{\pi}{2}} e^{-i\omega(t-\delta\tau)} + \frac{1}{2\pi} \int_{-\infty}^{\infty} d\omega' A_i(\omega') \hat{a}_i(\omega') e^{-i\omega'(t+\tau)} \right)$$

$$E_2^+(t) = \frac{1}{\sqrt{2}} E_s^+(t) + \frac{i}{\sqrt{2}} E_i^+(t) \quad (12)$$

$$= \frac{1}{\sqrt{2}} \left( \frac{1}{2\pi} \int_{-\infty}^{\infty} d\omega H_s(\omega) A_s(\omega) \hat{a}_s(\omega) e^{-i\omega t} + \frac{1}{2\pi} \int_{-\infty}^{\infty} d\omega' A_i(\omega') \hat{a}_i(\omega') e^{+i\frac{\pi}{2}} e^{-i\omega'(t+\tau+\delta\tau)} \right)$$

It is preferable to displace the semi-transparent mirror 40 such that the difference between the reflected optical path length of the signal light (first light) and the reflected optical path length of the idler light (second light) is sufficiently larger than the coherence length Lcoh of the signal light (first light) and the idler light (second light). Note that the semi-transparent mirror 40 is displaced in parallel along an arrow shown in FIG. 1. Namely, after the semi-transparent mirror 40 is displaced, the semi-transparent mirror is still tilted by 45 degrees with respect to the signal light (first light) and the idler light (second light). Note that the reflected optical path length of the signal light (first light) referred here is the length of the optical path along which the signal light is emitted from the optical parametric amplifier 26, is reflected by the semi-transparent mirror 40, and reaches the photon detecting means 50 (specifically, a first photon detector 50a described later). In addition, note that the reflected optical path length of the idler light (second light) referred here is the length of the optical path along which the idler light is emitted from the optical parametric amplifier 26, is reflected by the semi-transparent mirror 40, and reaches the photon detecting means 50 (specifically, a second photon detector 50b described later).

Note that, with this constitution, even when the semi-transparent mirror 40 is displaced, the transmitted optical path length of the signal light (first light) and the transmitted optical path length of the idler light (second light) remain constant, and do not change. Note that the transmitted optical path length of the signal light (first light) is the length of the optical path along which the signal light is emitted from the optical parametric amplifier 26, transmits through the semi-transparent mirror 40, and reaches the photon detecting means 50 (specifically, the second photon detector 50b described later). In addition, note that the transmitted optical path length of the idler light (second light) referred here is the length of the optical path along which the idler light is emitted from the optical parametric amplifier 26, transmits through the semi-transparent mirror 40, and reaches the photon detecting means 50 (specifically, the first photon detector 50a described later). It is possible to accurately measure the optical characteristics of the device under test 10 by displacing the semi-transparent mirror such that the difference between the reflected optical path length of the signal light and the reflected optical path length of the idler light is sufficiently larger than the coherence length Lcoh of the signal light and the idler light.

Note that a beam splitter may be used in place of the semi-transparent mirror 40.

The photon detecting means 50 detects photons in the first multiplexed light and the second multiplexed light. The photon detecting means 50 includes the first photon detector 50a and the second photon detector 50b. The first photon detector 50a detects single photons in the first multiplexed light. The second photon detector 50b detects single photons in the second multiplexed light. The first photon detector 50a and the second photon detector 50b can detect single photons. The first photon detector 50a and the second photon detector 50b can be realized by setting the Si-APD (Avalanche Photo Diode) to a photon counting mode. It is preferable that the position of at least either one of the first photon detector 50a and the second photon detector 50b can be finely adjusted so that the optical path lengths from the semi-transparent mirror 40 to the first photon detector 50a and the second photon detector 50b are exactly the same when the semi-transparent mirror 40 is at a so-called 0 position (zero position) which satisfies δτ=0.

The 0 position (zero position) implies a position of the semi-transparent mirror 40 which sets the difference between the reflected optical path length of the signal light (first light) and the reflected optical path length of the idler light (second light) to zero. Note that the reflected optical path length of the signal light (first light) is the length of the optical path along which the signal light is emitted from the optical parametric amplifier 26, is reflected by the semi-transparent mirror 40, and reaches the photon detecting means 50 (specifically, the first photon detector 50a). In addition, note that the reflected optical path length of the idler light (second light) referred here is the length of the optical path along which the idler light is emitted from the optical parametric amplifier 26, is reflected by the semi-transparent mirror 40, and reaches the photon detecting means 50 (specifically, the second photon detector 50b).

The photon simultaneous detection measuring means 60 measures a quantity which changes when the photons are simultaneously detected by the photon detecting means 50. Specifically, it counts frequency of simultaneous detection of photons by the photon detecting means 50. The photon simultaneous detection measuring means 60 includes a multiplier (simultaneous detection signal output means) 62 and a counter 64.

The multiplier (simultaneous detection signal output means) 62 supplies a pulse (simultaneous detection signal) when the first photon detector 50a and the second photon detector 50b simultaneously detect photons.

The counter 64 counts the pulse (simultaneous detection signal) supplied from the multiplier 62, and supplies the frequency of the output of the pulse.

The characteristic measuring means 70 measures the optical characteristics of the device under test 10 based on the output (frequency of the output of the simultaneous detection signal) from the photon simultaneous detection measuring means 60. The optical characteristics to be measured may be the delay, the attenuation constant, the refractivity, the dispersion, and the frequency characteristic of the dispersion.

First, how to measure the delay is described.

The product of the positive frequency component of the electric field operator of the first multiplexed light, the positive frequency component of the electric filed operator of the second multiplexed light, and the state vector for the entangled photon pair supplied from the optical parametric amplifier 26 is represented by expression (13).

$$E_2^+(t)E_1^+(t)|\Psi\rangle = \frac{1}{8\pi^2}e^{-i\omega_p t - i\omega_c \tau} \qquad (13)$$

$$\int_{-\infty}^{\infty} d\varepsilon \phi(\omega) H_s(\omega_c + \varepsilon) A_s(\omega_c + \varepsilon) A_i(\omega_c - \varepsilon) e^{i\varepsilon\tau}(1 - e^{2i\varepsilon\delta\tau})$$

The probability of detecting the entangled photon pair as simultaneity (probability that the first photodetector 50a and the second photodetector 50b simultaneously detect photons) when the delay τ of the variable delay line 30 is changed is expressed by expression (14) obtained by multiplying expression (13) by its Hamiltonian (phase) conjugate.

$$P(\tau) = \eta\langle\Psi|E_1^-(t)E_2^-(t)E_2^+(t)E_1^+(t)|\Psi\rangle \qquad (14)$$

$$= \eta \frac{A_s^2(\omega_c)A_i^2(\omega_c)}{64\pi^3}\sigma^2 e^{-2\alpha s} e^{-\frac{\sigma^2}{2}(\tau-Ts)^2}$$

$$\left(1 - e^{-\sigma^2\delta\tau^2}e^{-\sigma^2(\tau-Ts)^2}\right)^2$$

Note that η is detection efficiency of the first photon detector 50a and the second photon detector 50b.

Figure 2:
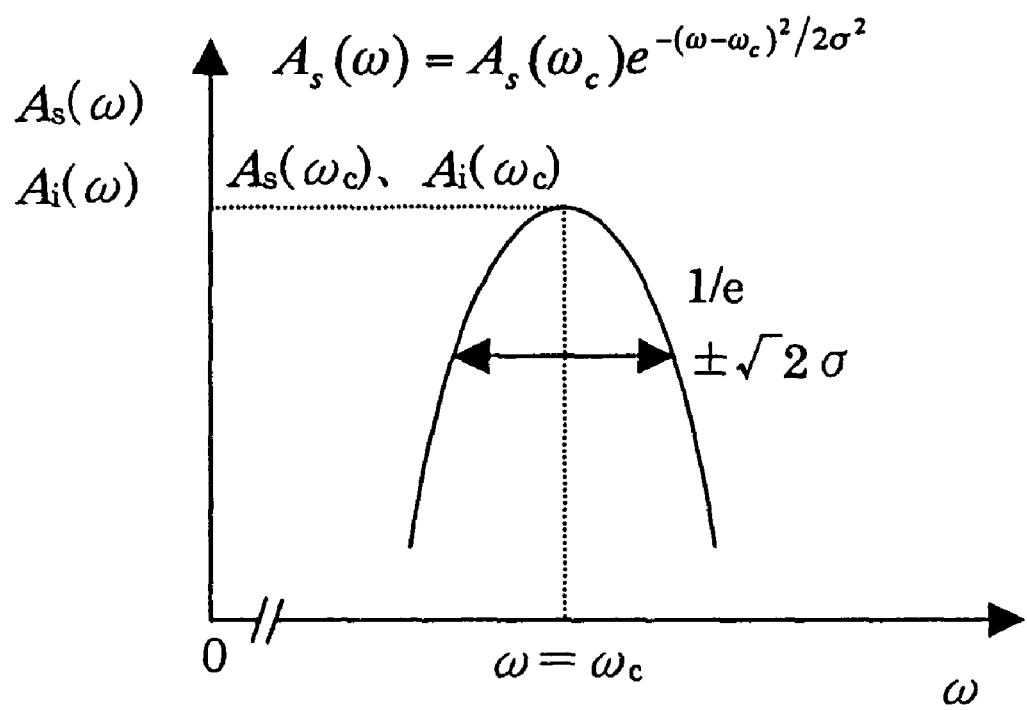
FIG. 2 is a chart showing a positive frequency component As(ω) of the electric field operator of a signal light and a positive frequency component Ai(ω) of the electric filed operator of an idler light supplied from an optical parametric amplifier 26.

The positive frequency component $A_s(\omega)$ of the electric field operator of the signal light and the positive frequency component $A_i(\omega)$ of the electric filed operator of the idler light supplied from the optical parametric amplifier 26 are shown in FIG. 2.

Figure 3:
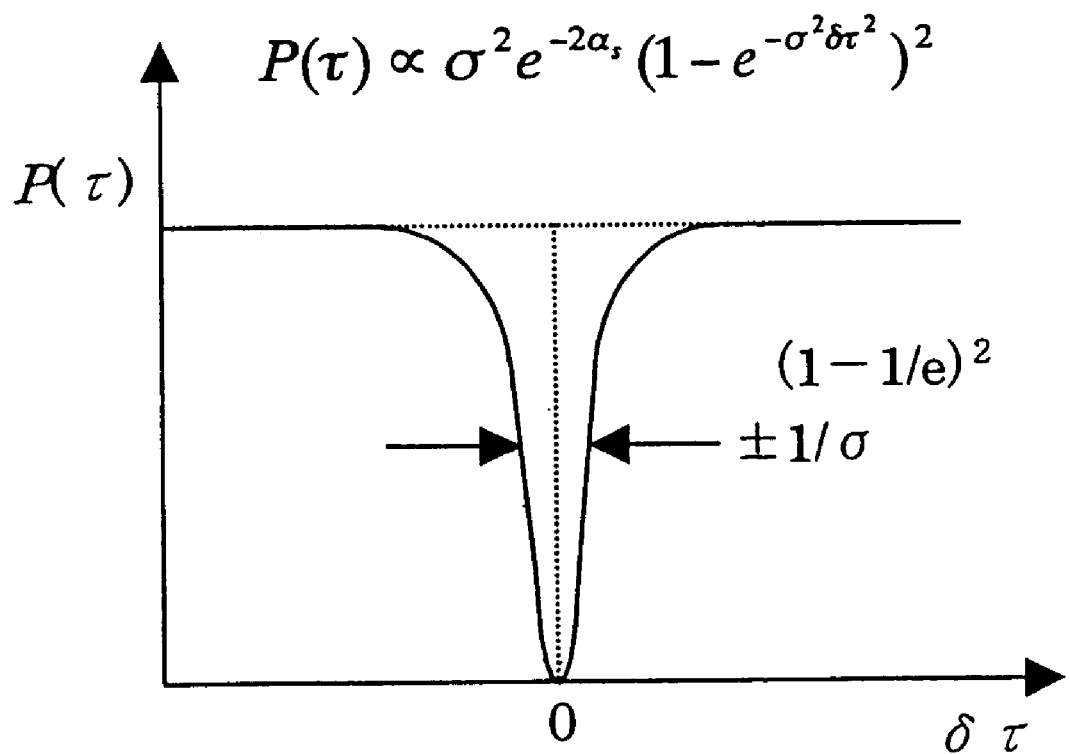
FIG. 3 shows a chart indicating probability P(τ) (when τ=Ts) that an entangled photon pair is detected as simultaneity.

The probability P(τ) that the entangled photon pair is detected as simultaneity (when τ=Ts) is shown in FIG. 3. As FIG. 3 shows, it is necessary to displace δτ from 0 position by a quantity sufficiently larger than ±1/σ so that P (τ) has significance. Namely, the movable distance cδτ (c is velocity of light) of the semi-transparent mirror 40 should be sufficiently larger than the coherence length Lcoh of the signal light (first light) and the idler light (second light). When δτ=0, the probability of P(τ) for simultaneous detection is 0. When δτ is displaced from 0 position by a quantity sufficiently larger than ±1/σ, the term of δτ in the probability of P(τ) for simultaneous detection is negligible, and P(τ) is approximated by only τ.

Figure 4:
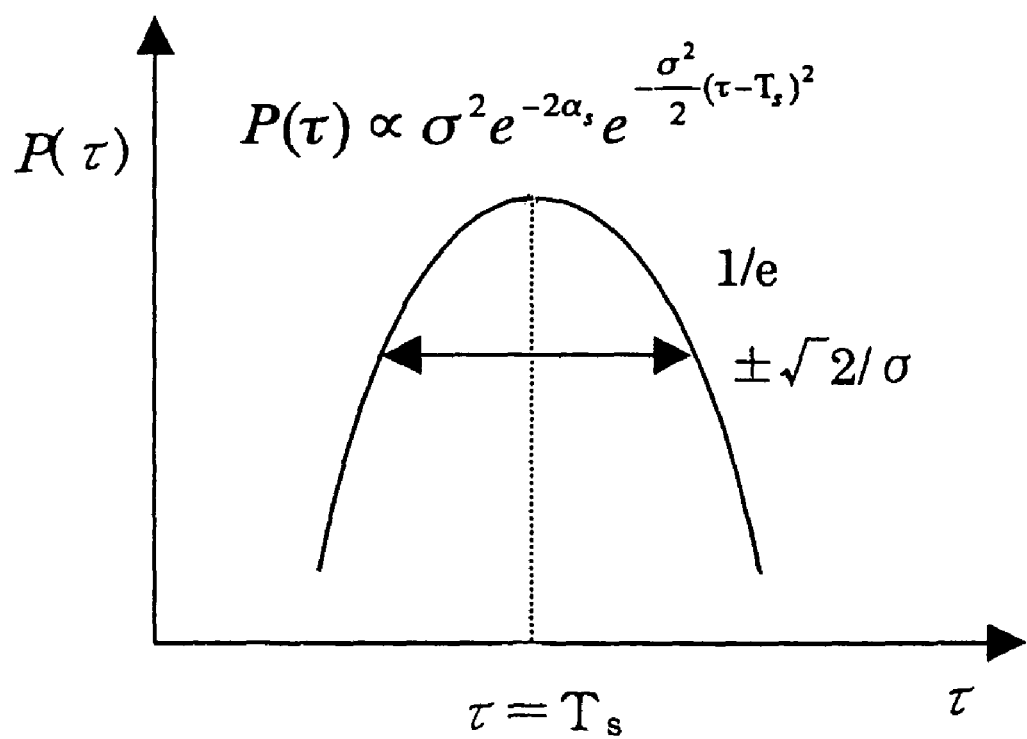
FIG. 4 shows a chart indicating the probability P(τ) for simultaneous detection and τ.

In this state, when P(τ) is measured while τ is being changed, as shown in FIG. 4, the P(τ) for simultaneous detection is at a peak when τ=Ts, namely, the delay τ of the variable delay line 30 is equal to the delay Ts of the device under test 10.

Thus, the delay τ is the delay Ts of the device under test 10 when the delay τ of the variable delay line 30 is changed by moving the movable mirror 30a, and consequently the P(τ) for simultaneous detection reaches the peak.

The following section describes how to measure the attenuation constant.

First, the device under test 10 is connected to the optical characteristic measuring apparatus, and the probability of P(τ) for simultaneous detection is measured. Then, the device under test 10 is detached from the optical characteristic measuring apparatus, and the signal light (first light) is directly supplied for the semi-transparent mirror 40. At this time, the probability of the simultaneous detection is set as P0(τ'). If the attenuation constant when the device under test 10 is not present is 0, $$P(\tau)/P0(\tau')=\exp(-2\alpha s).$$

Thus, the attenuation constant αs of the device under test 10 can be measured.

The following section describes why the probability of P(τ) for simultaneous detection takes on the peak (maximum) by adjusting τ when δτ is displaced from 0 position by a quantity sufficiently larger than ±1/τ. In this case, the difference between the reflected optical path length (optical parametric amplifier 26→semi-transparent mirror 40→first photon detector 50a) of the signal light (first light) and the reflected optical path length (optical parametric amplifier 26→semi-transparent mirror 40→second photon detector 50b) of the idler light (second light) is sufficiently larger than the coherence length Lcoh of the signal light and the idler light. Note that when δτ=0, the difference between the reflected optical path length of the signal light (first light) and the reflected optical path length of the idler light (second light) is 0.

Thus, for the entangled photon pairs reflected on the semi-transparent mirror 40, there is a difference in time between when the individual photon pairs reach the first photon detector 50a and the second photon detector 50b. Thus, they do not contribute to increasing the probability of the simultaneous detection.

On the other hand, for the entangled photon pairs transmitting through the semi-transparent mirror 40, it is possible to use the variable delay line 30 to exactly match the time when the photon reach the first photon detector 50a and the time when the photon reach the second photon detector 50b without the influence of the position of the semi-transparent mirror 40. Namely, it is possible to equalize the transmission optical path length of the signal light (first light) and the transmission optical path length of the idler light (second light). Thus, they contribute to increasing the probability of the simultaneous detection.

Therefore, the probability of simultaneous detection P (τ) reaches the peak (maximum) by adjusting the delay τ of the variable delay line 30.

The following section describes how to measure the refractivity.

When the optical path for the signal light where the device under test 10 is inserted, and the optical path of the idler light where the variable delay line 30 is inserted are exactly identical (as for the constitution including the optical path length and the constitution of the mirror) except for the device under test 10 and the variable delay line 30, the probability of simultaneous detection P (τ) reaches the peak (maximum) when τ=Ts as described above.

However, in practice, the two optical paths are not always the same, and the probability of simultaneous detection P (τ) reaches the peak (maximum) when τ=Ts+Δ. Then, the device under test 10 is detached from the optical characteristic measuring apparatus, and the signal light (first light) is directly supplied for the semi-transparent mirror 40. At this time, the probability of simultaneous detection P0(τ') reaches the peak (maximum) when τ'=T0+Δ. Note that T0 is the delay corresponding to a section to which the device under test 10 was attached when the device under test 10 is not connected. Thus, the difference in the delay τ–τ' between when the probability for the simultaneous detection P(τ) takes the peak (maximum) while the device under test 10 is connected and when the probability for the simultaneous detection P0(τ') takes the peak (maximum) while the device under test 10 is not connected is the difference between the delay Ts for the device under test 10 and the delay T0 when the device under test 10 is not connected (the period for which light travels in the vacuum or in the air by the length corresponding to the device under test 10). Namely, $$\tau - \tau' = Ts - T0.$$

Further, when the length of the device under test 10, and the refractivity n0 of the section where the device under test 10 was connected when the device under test 10 is not connected are known, the refractivity (n) of the device under test 10 is obtained as expression (15).

$$n = \frac{c}{L_{DUT}}(\tau - \tau') + n_0 \quad (15)$$

The following section describes how to measure the dispersion.

The impulse response function for the device under test 10 is represented as expression (16) when the dispersion is considered.

$$H_s(\omega_c + \epsilon) = \exp(-\alpha_s)\exp(-iT_s\epsilon)\exp(-il_s\beta_s\epsilon^2) \quad (16)$$

Note that βs is a dispersion parameter, and ls is the length of the device under test 10.

There is a relationship represented by expression (17) between the dispersion parameter βs and the wavelength dispersion Ds.

$$D_s = -\frac{\omega^2}{2\pi c}\beta_s l_s \quad (17)$$

Then, the match detection probability P'(τ) is represented by expression (18) when a new $\sigma_T$ is introduced.

$$P'(\tau) = \quad (18)$$

$$\eta \frac{A_s^2(\omega_c)A_i^2(\omega_c)}{64\pi^3}\sigma\sigma_T e^{-2\alpha_s} e^{-\frac{\sigma_T^2}{2}(\tau-T_s)^2}\left(1 - e^{-\sigma_T^2\delta\tau^2}e^{-\sigma_T^2(\tau-T_s)^2}\right)^2$$

$\sigma_T$ is represented by expression (19).

$$\sigma_T = \frac{\sigma}{\sqrt{1 + l_s^2\beta_s^2\sigma^4}} \leq \sigma \quad (19)$$

Figure 5:
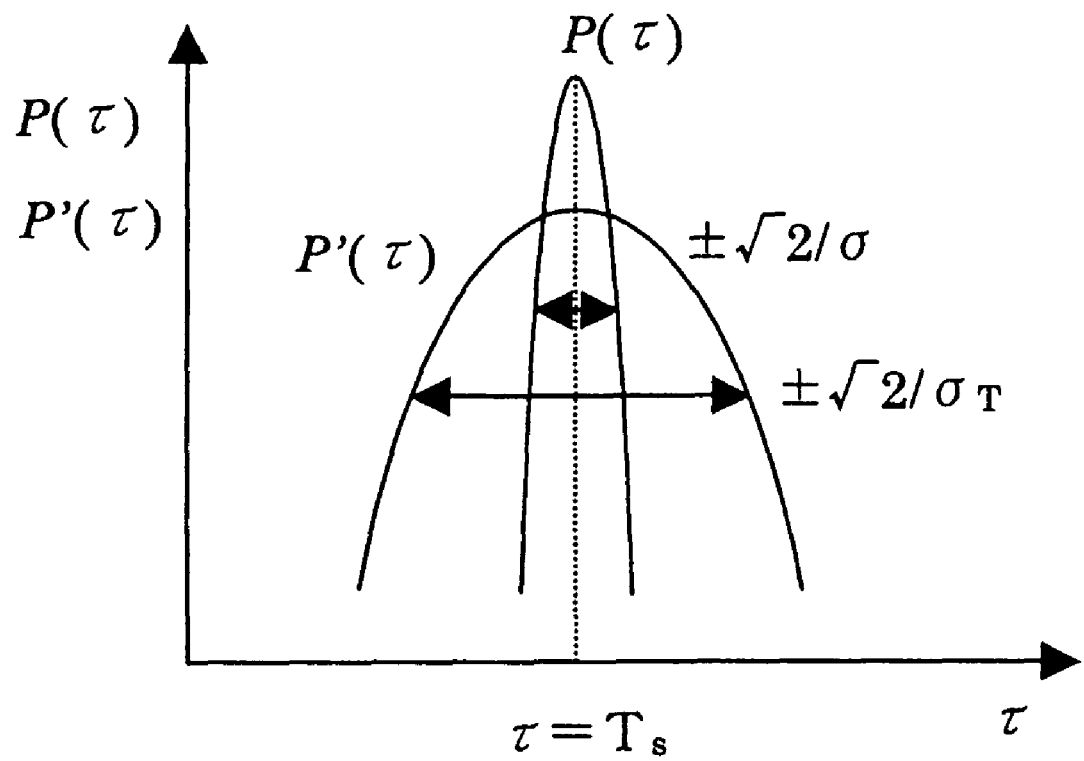
FIG. 5 is a chart indicating match detection probability P'(τ) where dispersion is considered, and the match detection probability P(τ) where the dispersion is not considered.

As shown in FIG. 5, the match detection probability P'(τ) spreads wider due to the influence from the dispersion than the match detection probability P(τ) where the dispersion is not considered. The dispersion of the device under test 10 is obtained from this spread.

Finally, the following section describes how to measure the frequency characteristic of the dispersion.

When the dispersion of the device under test 10 depends on the frequency, the match detection probability Q(τ) is equal to the product of the match detection probability P(τ) when the frequency dependency of the dispersion is not considered and a function F(τ). Namely, $$Q(\tau) = P(\tau)F(\tau).$$

Thus, by calculating the Fourier transform of the match detection probability Q(τ) obtained as a result of the measurement, the frequency spectrum is obtained, and the frequency characteristic of the dispersion in the region of a frequency dispersion σc about the center of the ωc is obtained.

The following section describes the operation of the first embodiment.

The input signal light generated by the light source for signal 22, and the input excited light generated by the light source for excitation 24 are entered to the optical parametric amplifier (OPA) 26. As a result, the signal light and the idler light are generated. The signal light (first light) is supplied for the device under test 10, and the idler light (second light) is supplied for the variable delay line 30. The signal light after transmitting through the device under test 10, and the idler light transmitting through the variable delay line 30 are supplied for the semi-transparent mirror 40.

The signal light reflected by the semi-transparent mirror 40, and the idler light transmitting through the semi-transparent mirror 40 are multiplexed, and supplied as first multiplexed light. The signal light transmitting through the semi-transparent mirror 40, and the idler light reflected by the semi-transparent mirror 40 are multiplexed, and supplied as second multiplexed light.

The photon is detected in the first multiplexed light by the first photon detector 50a, and the photon is detected in the second multiplexed light by the second photon detector 50b. When the photons are detected simultaneously, the multiplier 62 supplies the pulse (match detection signal), and the frequency of the output is supplied for the characteristic measuring means 70 from the counter 64.

The characteristic measuring means 70 obtains the probability of the match detection from the output frequency of the match detection signal. Then the optical characteristics of the device under test 10 are measured.

With the first embodiment, the optical characteristics of the device under test 10 are measured by using the quantum interference of the entangled photon pair to detect photons.

Thus, the limit of the detection sensitivity due to detecting light as "wave" is overcome, and it is possible to measure the optical parameters of the device under test 10 at a high accuracy or in a wide dynamic range.

Note that since the measurement is possible for weak light, it is possible to measure the device under test 10 without destruction, or without invasion. In addition, since a fringe pattern is not generated, which is different from the conventional Michelson interferometer, there is no ambiguity of integer multiples of the period or the phase of $2\pi$, the interferometer itself can measure the delay and the wavelength dispersion in addition to the attenuation constant of the device under test 10.

Further, since, different from the conventional network analyzer, a light intensity modulator is not used, influence of transmission characteristic itself of the modulator, or drift of the transmission characteristic on the measuring accuracy of the optical parameters of the device under test 10 does not matter.

Though the first embodiment might seem similar to a conventional Hong-Ou-Mandel quantum interferometer (see C. K. Hong, Z. Y. Ou, and L. Mandel, Phys. Rev. Lett. 59, 2044 (1987)), there is a significant difference.

Figure 6:
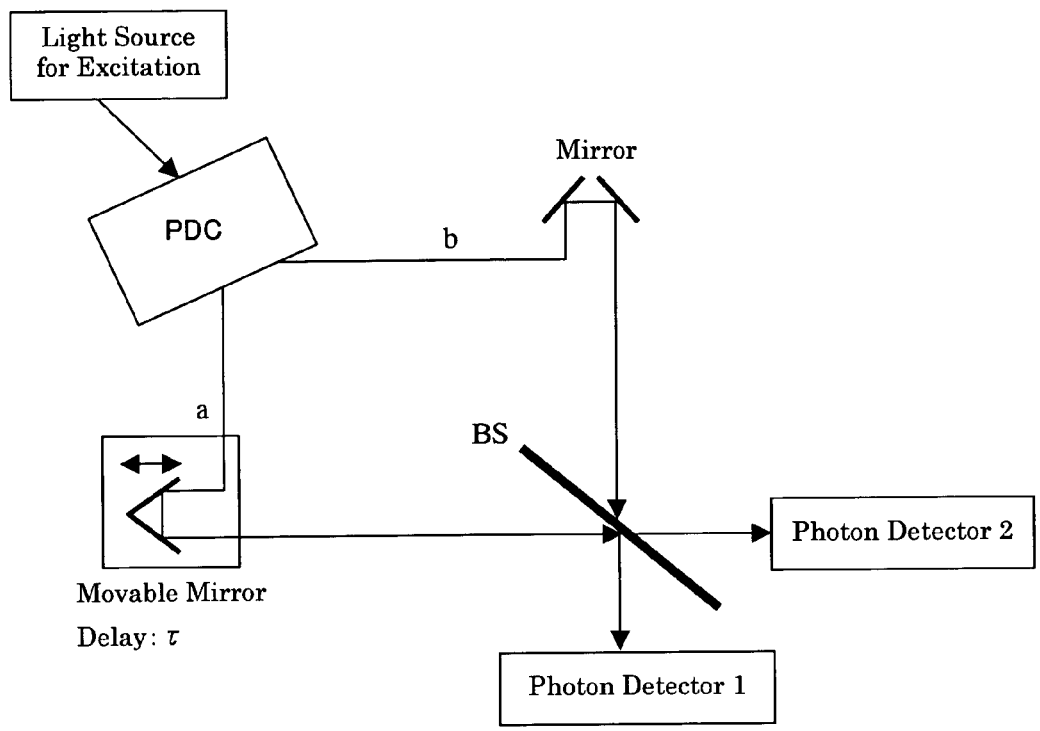
FIG. 6 shows the constitution of a conventional Hong-Ou-Mandel quantum interferometer.

Hong-Ou-Mandel quantum interferometer enters entangled photon pairs into optical paths (a) and (b), and combines on a beam splitter (BS) as shown in FIG. 6. At this time, the optical path difference between the optical paths (a) and (b) is within the range of the coherence length of the entangled photon pair. Consequently, the match detection probability takes a dip (minimal) (see around $\delta\tau=0$ in FIG. 3). This occurs when the both of the photons of the photon pair transmit through or are reflected by the beam splitter. However, it is not impossible to tell which phenomenon occurs. Interference which occurs due to incapability of determining which phenomenon occurs extends the concept of the quantum mechanics. An important thing here is the optical path difference between the optical paths (a) and (b) should be within the range of the coherence length of the entangled photon pair.

On the other hand, in the first embodiment, the difference between the reflection optical path length (optical parametric amplifier 26→semi-transparent mirror 40→first photon detector 50a) of the signal light (first light) and the reflection optical path length (optical parametric amplifier 26→semi-transparent mirror 40→second photon detector 50b) of the idler light (second light) is sufficiently larger than the coherence length Lcoh of the signal light and the idler light. As a result, the photon match detection probability is displaced from the dip (minimal) (see a section where $\delta\tau$ is displaced from 0 position by a quantity sufficiently larger than $\pm 1/\sigma$) in FIG. 3. Otherwise, the match detection probability of the photons is not measured, and the optical characteristics of the device under test 10 are not measured.

Namely, in the first embodiment, the optical path difference between the two optical paths of the interferometer is sufficiently larger than the coherence length of the entangled photon pair, which is a characteristic opposite to the conventional Hong-Ou-Mandel quantum interferometer.

Second Embodiment

A second embodiment is different from the first embodiment in the constitution of the entangled photon pair generating means 20, the photon detecting means 50, and the photon match detection measuring means 60.

Figure 7:
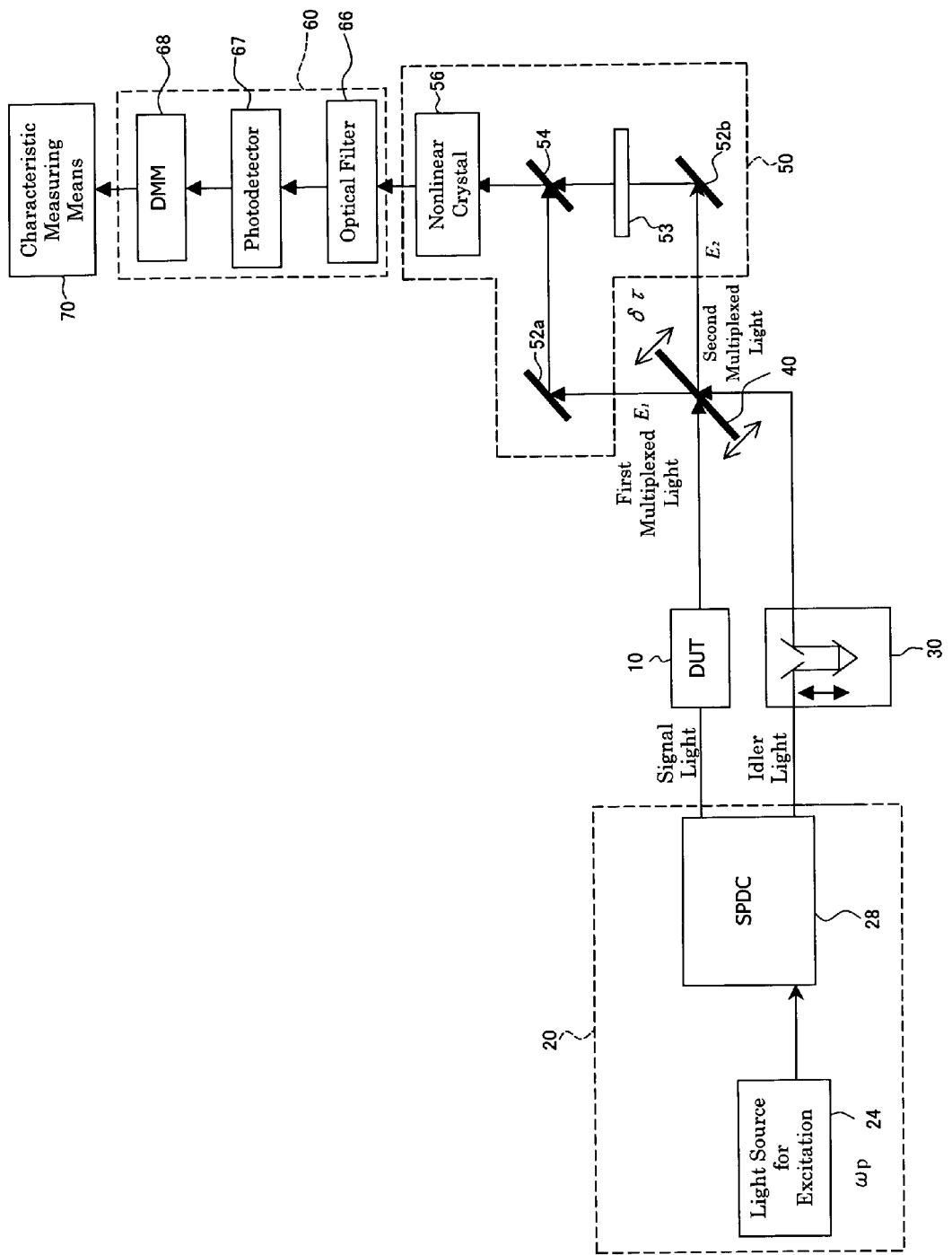
FIG. 7 is a block diagram showing the constitution of an optical characteristic measuring apparatus according to a second embodiment of the present invention.
Figure 8:
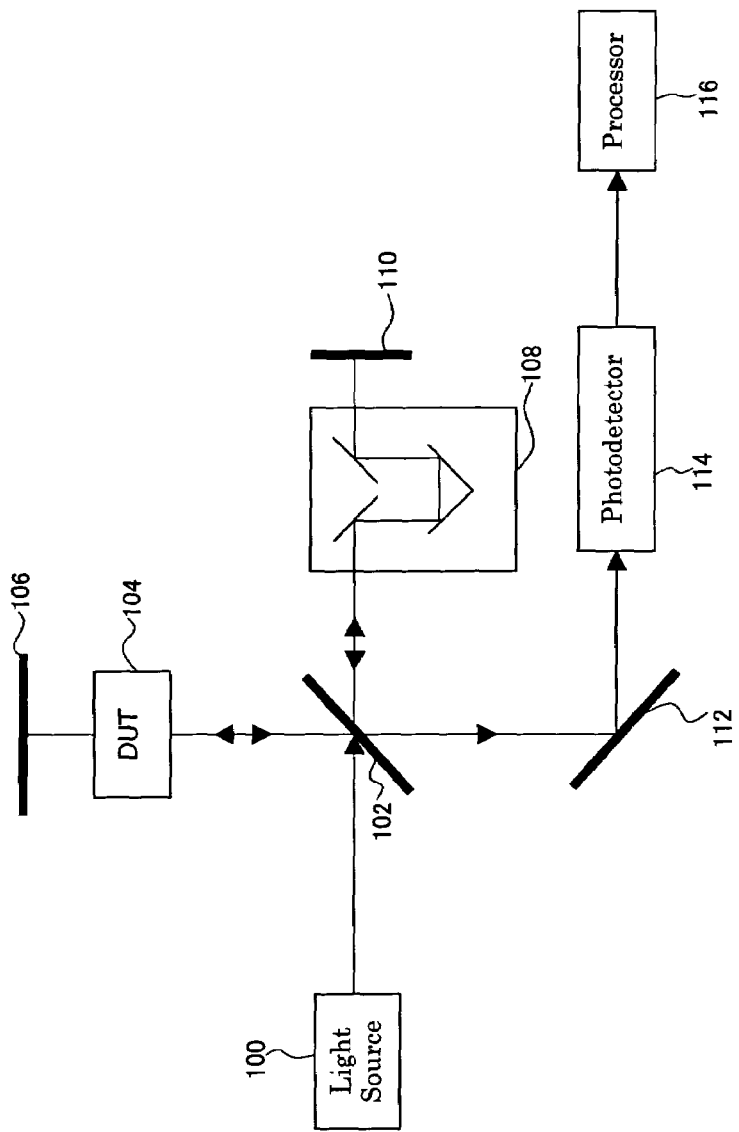
FIG. 8 shows a constitution using a Michelson interferometer of prior art for measuring a device under test (DUT)
Figure 9:
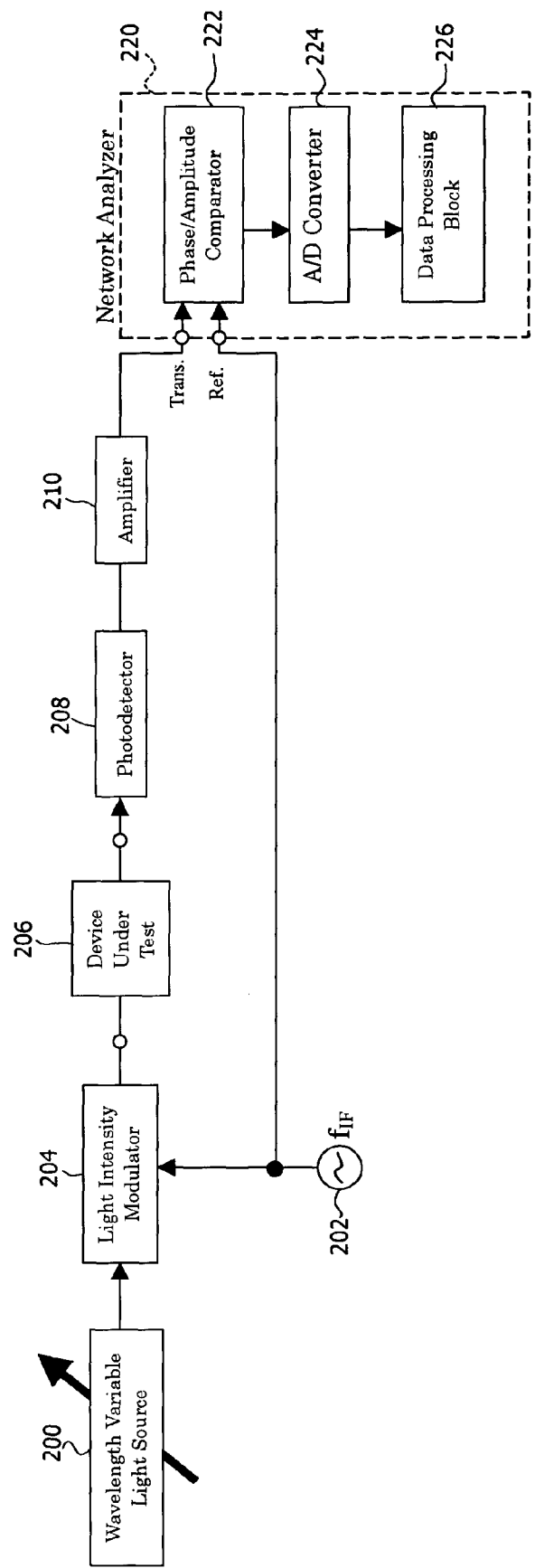
FIG. 9 shows a constitution of a measuring system using an optical network analyzer of prior art for measuring a device under test (DUT).

FIG. 7 is a block diagram showing the constitution of an optical characteristic measuring apparatus according to the second embodiment of the present invention. The optical characteristic measuring apparatus according to the second embodiment measures the wavelength dependency of the optical parameters such as the delay, the attenuation constant, and the dispersion of the device under test 10 (DUT).

The optical characteristic measuring apparatus includes the entangled photon pair generating means 20, the variable delay line (optical path length changing means) 30, the semi-transparent mirror (quantum interfering means) 40, the photon detecting means 50, the photon match detection measuring means 60, and the characteristic measuring means 70. In the following section, the same reference numerals are assigned with parts similar to those in the first embodiment, and description for them is not provided.

The entangled photon pair generating means 20 generates entangled photon pairs. The entangled photon pair generating means 20 includes the light source for excitation 24, and a SPDC (Spontaneous Parametric Down-Converter) 28.

The light source for excitation 24 is similar to that in the first embodiment. The spontaneous parametric down-converter 28 receives the input excited light (frequency $\omega p$), and generates signal light (frequency ($\omega s$)) and idler light (frequency $\omega i=\omega p-\omega s$). Note that the spontaneous parametric down-converter 28 can be formed by preventing input signal light from entering into the optical parametric amplifier (OPA) 26.

The variable delay line (optical path changing means) 30 and the semi-transparent mirror (quantum interfering means) 40 are similar to those in the first embodiment.

The photon detecting means 50 detects photons in the first multiplexed light and the second multiplexed light. The photon detecting means 50 includes mirrors 52a and 52b, a half wavelength plate 53, a semi-transparent mirror 54, and a nonlinear crystal (match detection light supplying means) 56.

The mirror 52a changes the travel direction of the first multiplexed light by 90 degrees, and the mirror 52b changes the travel direction of the second multiplexed light by 90 degrees. As a result, the first multiplexed light and the second multiplexed light are orthogonal to each other.

The half wavelength plate 53 shifts the polarization of the second multiplexed light reflected by the mirror 52b by 90 degrees before the first multiplexed light and the second multiplexed light intersect. Note that the half wavelength plate 53 may be disposed such that it shifts the polarization of the first multiplexed light reflected by the mirror 52a by 90 degrees before the first multiplexed light and the second multiplexed light intersect.

The semi-transparent mirror 54 is disposed at the point where the first multiplexed light and the second multiplexed light intersect. The semi-transparent mirror 54 multiplexes the first multiplexed light and the second multiplexed light into third multiplexed light, and supplies the nonlinear crystal 56 with the third multiplexed light.

The nonlinear crystal (match detection light output means) 56 is a type II nonlinear crystal (SHG crystal, and the phase match condition is met when $\omega c=\omega p/2$ and $\omega p$). The nonlinear crystal 56 supplies the match detection light whose frequency is the sum of the frequency of the first multiplexed light and the frequency of the second multiplexed light (namely $\omega p$) when the intensity of the first multiplexed light and the intensity of the second multiplexed light are simultaneously high.

The photon match detection measuring means 60 measures a quantity which changes when the photons are simultaneously detected by the photon detecting means 50. Specifically, the change in the intensity of the match detection light supplied from the photon detecting means 50 is measured. The photon match detection measuring means 60 includes an optical filter 66, a photodetector 67, and a digital multi-meter (DMM) (voltage measuring means) 68.

The optical filter 66 receives the output from the nonlinear crystal 56, transmits only the light with the frequency of ωp which is the sum of the frequencies of the first multiplexed light and the second multiplexed light, and removes the other light. The photodetector 67 applies photo/electric conversion to the output from the optical filter 66. The digital multi-meter (DMM) (voltage measuring means) 68 measures the voltage of the electric signal supplied from the photodetector 67. This voltage indicates the change in the intensity of the match detection light. The voltage is supplied for the characteristic measuring means 70.

The characteristic measuring means 70 is similar to that in the first embodiment. The intensity change of the match detection light can be handled as the match detection probability P(τ) in the first embodiment.

The following section describes the operation of the second embodiment.

The input excited light generated by the light source for excitation 24 is entered to the spontaneous parametric downconverter 28. As a result, the signal light and the idler light are generated. The signal light (first light) is supplied for the device under test 10, and the idler light (second light) is supplied for the variable delay line 30. The signal light after transmitting through the device under test 10, and the idler light transmitting through the variable delay line 30 are supplied for the semi-transparent mirror 40.

The signal light reflected by the semi-transparent mirror 40, and the idler light transmitting through the semi-transparent mirror 40 are multiplexed, and supplied as first multiplexed light. The signal light transmitting through the semi-transparent mirror 40, and the idler light reflected by the semi-transparent mirror 40 are multiplexed, and supplied as second multiplexed light.

The travel direction of the first multiplexed light and the second multiplexed light are changed by the mirror 52a and the mirror 52b respectively by 90 degrees, and intersect on the semi-transparent mirror 54. Note that the polarization of the second multiplexed light is changed by the half wavelength plate 53 by 90 degrees before the intersection. The first multiplexed light and the second multiplexed light are multiplexed by the semi-transparent mirror 54 into the third multiplexed light, and the third multiplexed light is supplied for the nonlinear crystal 56. The nonlinear crystal 56 supplies the match detection light whose frequency is the sum (namely ωp) of the frequency of the first multiplexed light and the frequency of the second multiplexed light when the intensity of the first multiplexed light and the intensity of the second multiplexed light are simultaneously high.

The output from the nonlinear crystal 56 is filtered by the optical filter 66, and only the match detection light is supplied for the photodetector 67. The photodetector 67 converts the match detection light from light to electricity, and the voltage of the electric signal as a conversion result is measured by the digital multi-meter (DMM) 68. This voltage indicates the change in the intensity of the match detection light. The voltage is supplied for the characteristic measuring means 70.

The characteristic measuring means 70 measures the optical characteristics of the device under test 10 based on the change in the intensity of the match detection light.

With the second embodiment, effects similar to those of the first embodiment are obtained.

The embodiments described above may be realized in the following constitution. A computer includes a CPU, a hard disk, and a media (such as a floppy disk and a CD-ROM) reader, the media reader reads a medium recording a program realizing the individual parts described above such as the characteristic measuring means 70, and the program is installed on the hard disk. This method may realize the functions described above.

The invention claimed is:

1. An optical characteristic measuring apparatus for measuring optical characteristic of a device under test, the apparatus comprising:

an entangled photon pair generating element for generating an entangled photon pair, and supplying said device under test with first light which is one of said entangled photon pair;

an optical path length changing element for changing at least one of an optical path of second light which is the other one of said entangled photon pair, and an optical path of said first light;

a quantum interfering element for transmitting and reflecting said first light transmitting through said device under test, transmitting and reflecting said second light, supplying first multiplexed light which is formed by multiplexing the reflected component of said first light and the transmitted component of said second light, and supplying second multiplexed light which is formed by multiplexing the transmitted component of said first light and the reflected component of said second light;

a photon detecting element for detecting a photon in said first multiplexed light and said second multiplexed light;

a photon simultaneous detection measuring element for measuring a quantity which changes when the photons are simultaneously detected by said photon detecting element; and a characteristic measuring element for measuring the optical characteristic of said device under test based on the quantity measured by said photon simultaneous detection measuring element.

2. The optical characteristic measuring apparatus according to claim 1, wherein:

said entangled photon pair generating element comprises:

a light source for signal for generating input signal light;

a light source for excitation for generating input excited light with a frequency higher than that of said input signal light; and an optical parametric amplifier for receiving said input signal light and said input excited signal light, and generating signal light with a frequency equal to the frequency of said input signal light, and idler light with a frequency equal to the difference between the frequency of said input excited light and the frequency of said input signal light.

3. The optical characteristic measuring apparatus according to claim 2, wherein said characteristic measuring element measures a frequency characteristic of the dispersion in a region of a frequency dispersion with the phase matching frequency of said optical parametric amplifier as the center based on Fourier transform of the quantity measured by said photon simultaneous detection measuring element.

4. The optical characteristic measuring apparatus according to claim 1, wherein:

said entangled photon pair generating element comprises:

a light source for excitation for generating input excited light; and a spontaneous parametric down-converting element for receiving said input excited light, and generating signal light and idler light.

5. The optical characteristic measuring apparatus according to claim 1, wherein said quantum interfering element is a semi-transparent mirror.

6. The optical characteristic measuring apparatus according to claim 5, wherein:
the transmission optical paths from said entangled photon pair generating element, transmitting thorough said quantum interfering element, to said photon detecting element of said first light and said second light can be set equal, and
the reflection optical paths from said entangled photon pair generating element, reflected by said quantum interfering element, to said photon detecting element of said first light and said second light can differ from each other by a length sufficiently longer than the coherence length of the first light and the second light.

7. The optical characteristic measuring apparatus according to claim 1, wherein said quantum interfering element is a beam splitter.

8. The optical characteristic measuring apparatus according to claim 1, wherein:
said photon detecting element comprises:
a first photon detecting element for detecting a photon of said first multiplexed light; and
a second photon detecting element for detecting a photon of said second multiplexed light.

9. The optical characteristic measuring apparatus according to claim 8, wherein:
said photon simultaneous detection measuring element comprises:
a simultaneous detection signal supplying element for supplying a simultaneous detection signal when said first photon detecting element and said second photon detecting element simultaneously detect photons; and
a counting element for counting the frequency of said simultaneous detection signal supplied from said simultaneous detection signal supplying element.

10. The optical characteristic measuring apparatus according to claim 1, wherein:
said photon detecting element comprises:
a third multiplexed light generating element for generating third multiplexed light by multiplexing said first multiplexed light and said second multiplexed light after changing the direction of polarization of the first multiplexed light or the second multiplexed light by 90 degrees; and
a simultaneous detection light supplying element for receiving said third multiplexed light, and supplying simultaneous detection light whose frequency is the sum of the frequency of said first multiplexed light and the frequency of said second multiplexed light when the first multiplexed light and the second multiplexed light simultaneously have high light intensity.

11. The optical characteristic measuring apparatus according to claim 10, wherein:
said photon simultaneous detection measuring element comprises:
an optical filter for receiving the output from said simultaneous detection light supplying element, and transmitting the light having the frequency which is the sum of the frequency of said first multiplexed light and the frequency of said second multiplexed light;
a light detecting element for converting the light having transmitted through said optical filter into an electric signal; and
a voltage measuring element for measuring the voltage of said electric signal.

12. The optical characteristic measuring apparatus according to claim 1, wherein said characteristic measuring element measures the delay or the dispersion of said device under test.

13. The optical characteristic measuring apparatus according to claim 1, wherein said characteristic measuring element measures the attenuation constant of said device under test based on the quantity measured by said photon simultaneous detection measuring element when said first light is supplied for said device under test, and the quantity measured by said photon simultaneous detection measuring element when the first light is directly entered into said quantum interfering element.

14. An optical characteristic measuring method for measuring optical characteristic of a device under test, the method comprising:
an entangled photon pair generating step for generating an entangled photon pair, and supplying said device under test with first light which is one of said entangled photon pair;
an optical path length changing step for changing at least one of an optical path of second light which is the other one of said entangled photon pair, and an optical path of said first light;
a quantum interfering step for transmitting and reflecting said first light transmitting through said device under test, transmitting and reflecting said second light, supplying first multiplexed light which is formed by multiplexing the reflected component of said first light and the transmitted component of said second light, and supplying second multiplexed light which is formed by multiplexing the transmitted component of said first light and the reflected component of said second light;
a photon detecting step for detecting a photon in said first multiplexed light and said second multiplexed light;
a photon simultaneous detection measuring step for measuring a quantity which changes when the photons are simultaneously detected by said photon detecting step; and
a characteristic measuring step for measuring the optical characteristic of said device under test based on the quantity measured by said photon simultaneous detection measuring step.

15. A program of instructions for execution by the computer to perform an optical characteristic measuring process performed by an apparatus for measuring optical characteristic of a device under test comprising: an entangled photon pair generating element for generating an entangled photon pair, and supplying said device under test with first light which is one of said entangled photon pair; an optical path length changing element for changing at least one of an optical path of second light which is the other one of said entangled photon pair, and an optical path of said first light; a quantum interfering element for transmitting and reflecting said first light transmitting through said device under test, transmitting and reflecting said second light, supplying first multiplexed light which is formed by multiplexing the reflected component of said first light and the transmitted component of said second light, and supplying second multiplexed light which is formed by multiplexing the transmitted component of said first light and the reflected component of said second light; a photon detecting element for detecting a photon in said first multiplexed light and said second multiplexed light; and a photon simultaneous detection measuring element for measuring a quantity which changes when the photons are simultaneously detected by said photon detecting element, the process comprising a characteristic measuring processing for measuring the optical characteristic of said device under test based on the quantity measured by said photon simultaneous detection measuring element.

16. A computer-readable medium having a program of instructions for execution by the computer to perform an optical characteristic measuring process performed by an apparatus for measuring optical characteristic of a device under test comprising: an entangled photon pair generating element for generating an entangled photon pair, and supplying said device under test with first light which is one of said entangled photon pair; an optical path length changing element for changing at least one of an optical path of second light which is the other one of said entangled photon pair, and an optical path of said first light; a quantum interfering element for transmitting and reflecting said first light transmitting through said device under test, transmitting and reflecting said second light, supplying first multiplexed light which is formed by multiplexing the reflected component of said first light and the transmitted component of said second light, and supplying second multiplexed light which is formed by multiplexing the transmitted component of said first light and the reflected component of said second light; a photon detecting element for detecting a photon in said first multiplexed light and said second multiplexed light; and a photon simultaneous detection measuring element for measuring a quantity which changes when the photons are simultaneously detected by said photon detecting element, the process comprising a characteristic measuring processing for measuring the optical characteristic of said device under test based on the quantity measured by said photon simultaneous detection measuring element.

* * * * *